July 22, 1958

E. M. BULL ET AL 2,844,054

UNIVERSAL DRILL JIG

Filed Dec. 6, 1956

INVENTOR.
EDGAR M. BULL
CARL J. DiJULIO
BY
Walter G. Finch
ATTORNEY

July 22, 1958
E. M. BULL ET AL
2,844,054
UNIVERSAL DRILL JIG
Filed Dec. 6, 1956
3 Sheets-Sheet 2
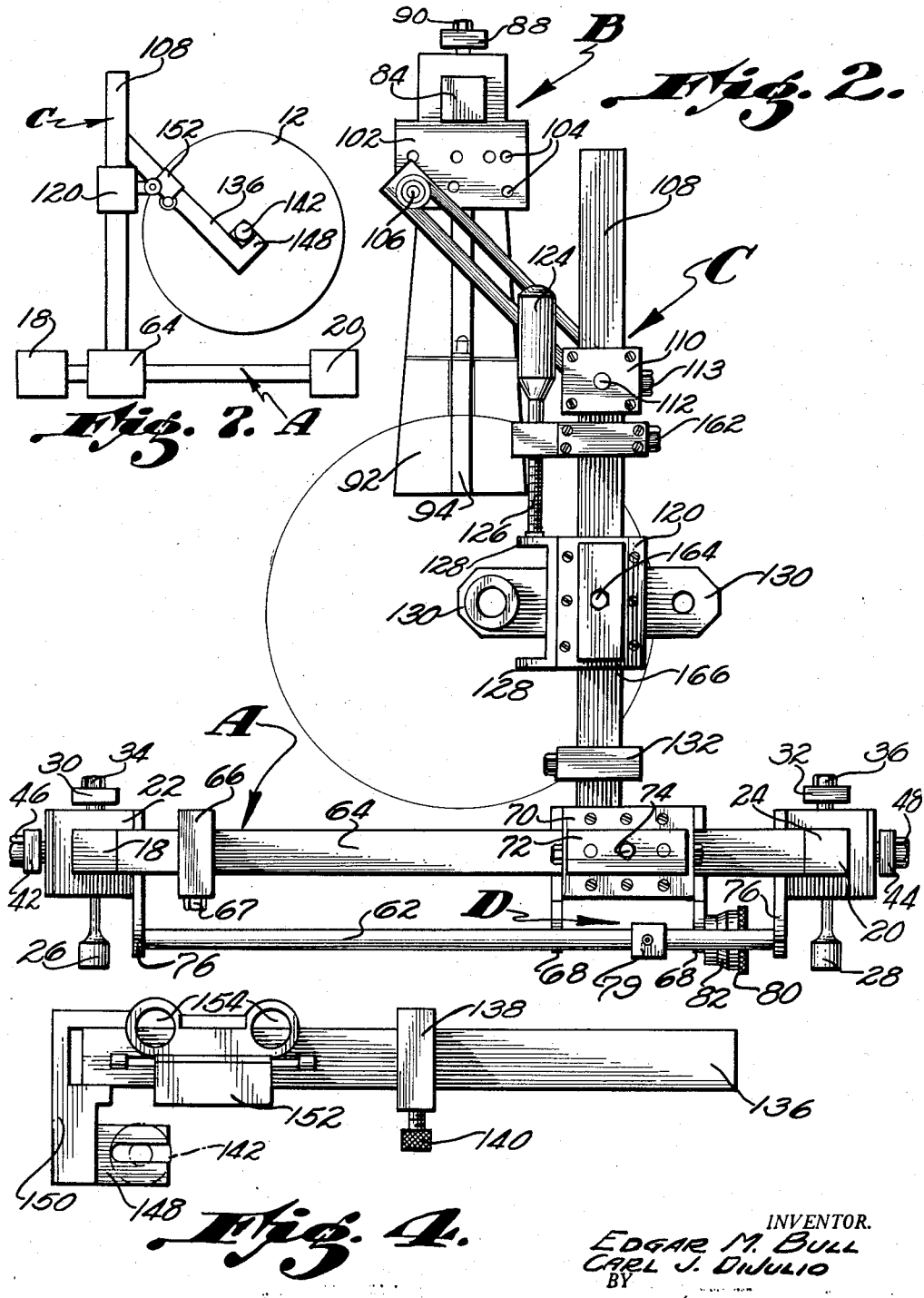
INVENTOR.
EDGAR M. BULL
CARL J. DIJULIO
BY
Walter G. Finch
ATTORNEY July 22, 1958
E. M. BULL ET AL
2,844,054
UNIVERSAL DRILL JIG
Filed Dec. 6, 1956
3 Sheets-Sheet 3
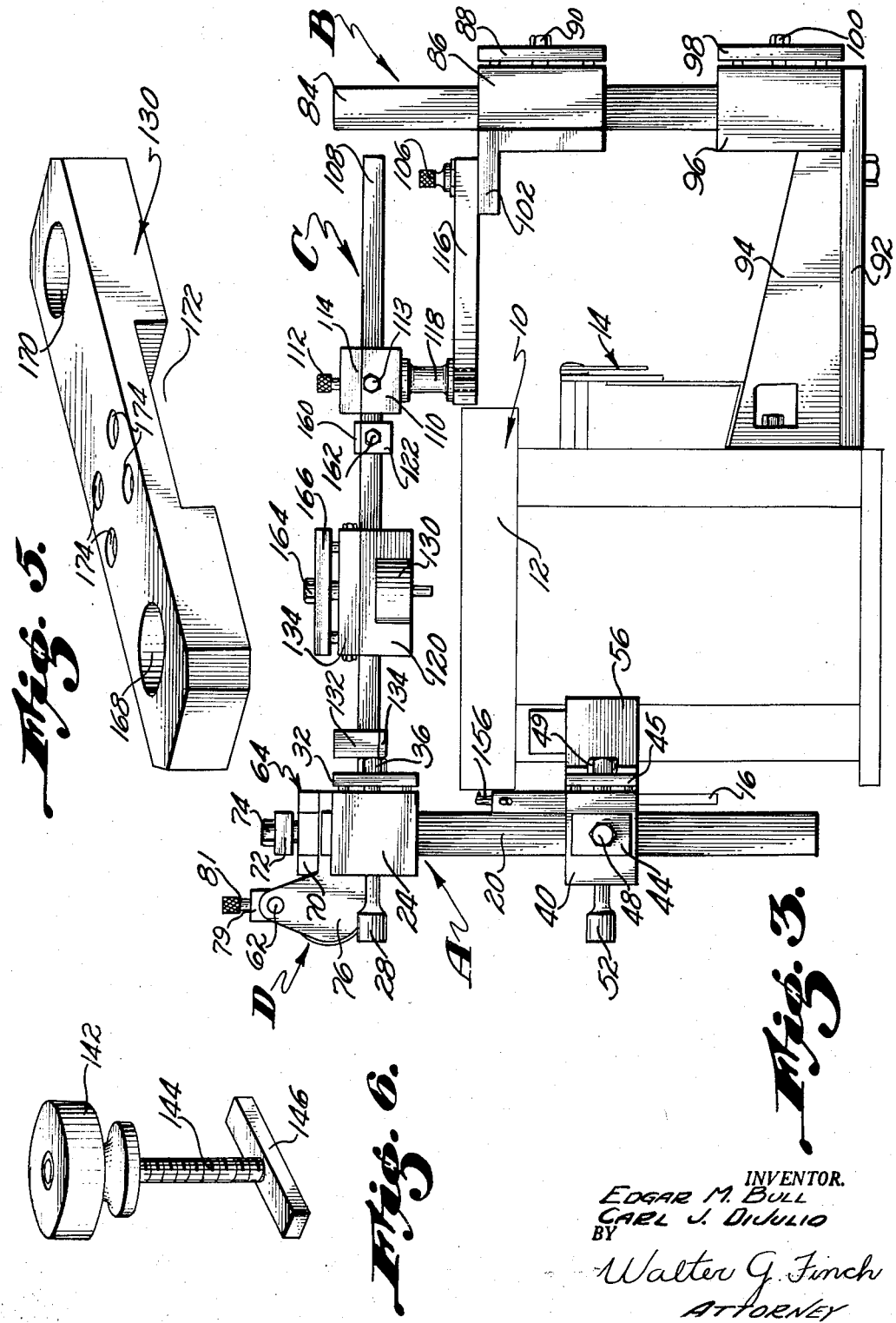
INVENTOR.
EDGAR M. BULL
CARL J. DIJULIO
BY
Walter G. Finch
ATTORNEY

United States Patent Office 2,844,054
Patented July 22, 1958

2,844,054

UNIVERSAL DRILL JIG

Edgar M. Bull, Baltimore, and Carl J. Di Julio, Towson, Md.

Application December 6, 1956, Serial No. 626,726

10 Claims. (Cl. 77—64)

The present invention relates to a universal drill jig. More particularly it relates to a drill jig adapted for locating hole centers dimensioned in either rectangular or polar coordinates.

Ordinarily, drilling operations not involving mass production are carried out by laying out the hole centers directly on the work with a scale and scratch awl. The accuracy of such a method is obviously limited and although an extremely accurate machine for producing holes is available in the form of a jig borer, the cost of such a machine prohibits its use in the small machine shop.

It is therefore an important object of the present invention to provide a drill jig for locating hole centers with precision far in excess of that obtained by layout methods.

A further object of the present invention is to provide a drill jig suitable for locating holes directly according to dimensions given in polar coordinate form without requiring computation or reference to trigonometric tables.

An additional object of the present invention is to provide a drill jig combined with a universal index for the purpose of generating trigonometric functions and for spacing holes about the circumference of a generating circle.

Another object of the present invention is to provide a universal drill jig including a drill guide bushing which may be positioned by means of a precision micrometer formed integrally with said jig, thereby reducing the number of precision gauge blocks which might otherwise be required.

Still another object of the present invention is to provide a drill jig capable of locating holes drilled at an angle to the work even though the hole center is located only by coordinates given in a horizontal plane.

Other objects, features and advantages will become evident as an understanding of the invention is gained through consideration of the following detailed description and the accompanying drawings, wherein:

Fig. 2 is a plan of the invention;

Fig. 3 is a left side elevation of the invention;

Fig. 4 is a plan of a radial gauge arm forming part of the present invention;

Fig. 5 is a perspective of the bushing plate positioned by means of the invention;

Fig. 6 is a perspective of the holddown screw employed to secure the gauge arm of Fig. 4 in position; and Fig. 7 illustrates schematically the location of a hole by means of polar coordinates.

Figure 1:
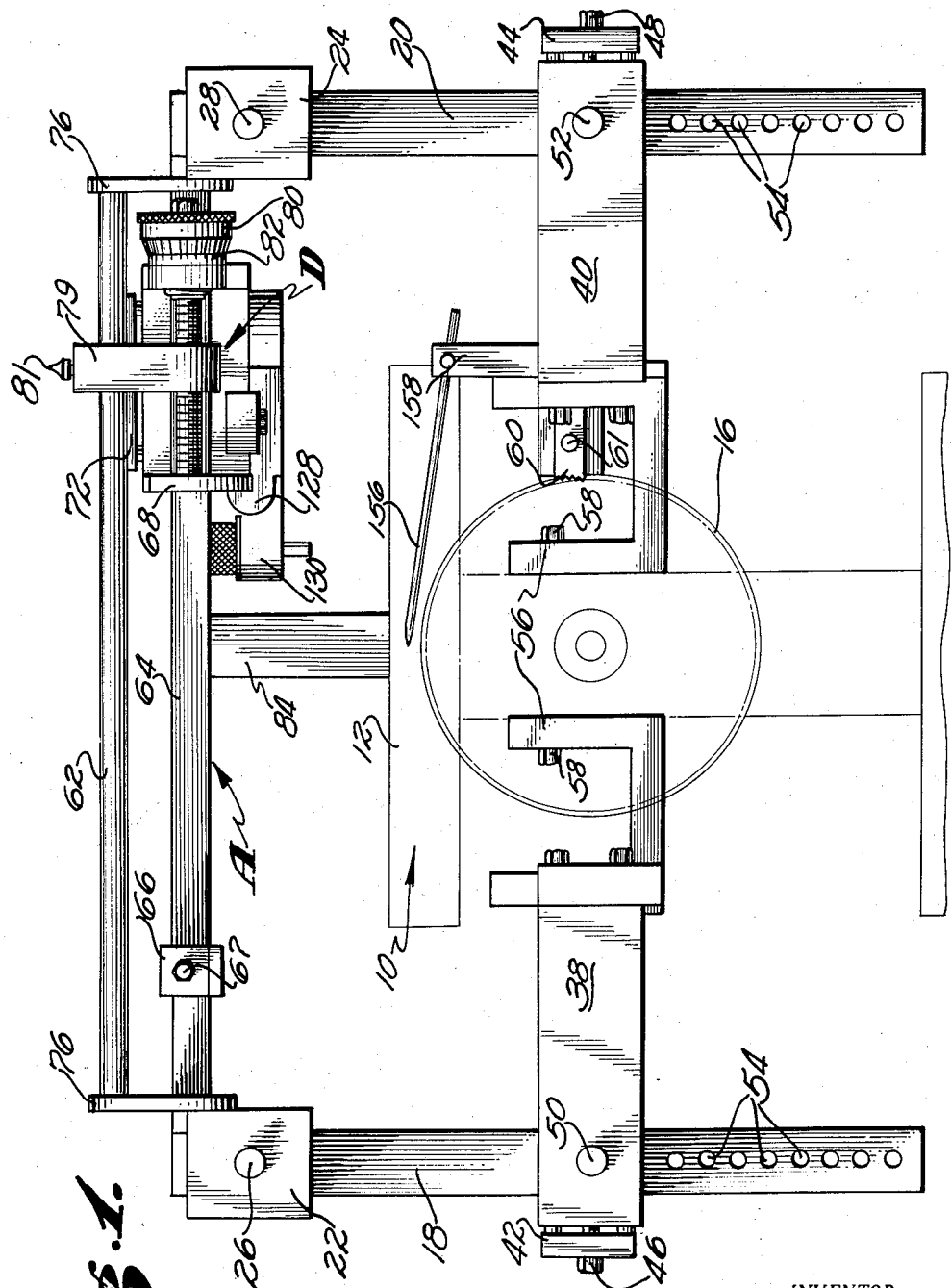
Fig. 1 is a front elevation of the drill jig of the present invention.

Referring to the drawings and particularly to Figs. 1, 2, and 3 thereof, the universal drill jig includes a horizontal gauge arm, shown generally at A, adapted for the precise location of the abscissa coordinate of a hole center, and a cross gauge arm, shown generally at C, arranged perpendicular to arm A for laying off the ordinate dimension of a hole center. An outport column and steady block, shown generally at B, supports the outer end of the cross arm C. Arm C carries a tracer block bearing a drill bushing plate. Both arms A and C are provided with micrometer mechanisms for precision adjustments beyond or intermediate of the dimensions of the gauge blocks which may be available.

Referring in detail to Fig. 1, arm A is supported at its ends by vertical columns 18 and 20 to which said arm is secured by slide blocks 22 and 24. Columns 18 and 20 are supported by horizontally extending exterior arms 38 and 40 secured by U-shaped brackets 58 to the vertical column carrying the work table 12 of a universal index, generally indicated at 10 in outline form. While the index 10 may be of any suitable type, it is preferably of the type described and claimed in U. S. Patent No. 2,752,802, issued on July 3, 1956, to Edgar M. Bull and Carl J. Di Julio, the inventors herein, for Universal Index and Generator. When the present invention is combined with the device of the cited patent, the brackets 58 may serve to support elements of the index, as for example, a tooth engager 60 with adjusting screw 61 for the index plate 16 of said index and an angle indicator 156 with holder 158 for indicating rotation of the table 12.

The height of colums 18 and 20 is adjusted by means of locating pins 50 and 52 in exterior arms 38 and 40 which are passed through holes 54 in the lower portions of said columns. The columns 18 and 20 are rigidly clamped in a plumb position by clamping plates 42 and 44 drawn up by clamp bolts 46 and 48. Finer adjustments in the height of arm A may be made by means of slide blocks 22 and 24 which are slidingly carried by columns 18 and 20 and which may be rigidly secured thereto, as may be seen in Fig. 2, by clamp plates 30 and 32 drawn up by clamp bolts 34 and 36.

Referring in detail now to Fig. 2, arm A includes a gauge rail 64 which slidingly carries the right angle arm C and its micrometer adjusting mechanism D. Arm C is slidingly supported on gauge rail 64 by a slide block 70. Running parallel with gauge rail 64, is a cylindrical slide rail 62 which is supported at its ends by brackets 76 secured to the columnar slide blocks 22 and 24. A micrometer screw 80, best seen in Fig. 1, is journaled in forwardly extending brackets 68 mounted on slide block 70. A micrometer nut 79 is threaded on micrometer screw 80 and is slidingly carried on slide rail 62. A set screw 81, passed through micrometer nut 79, secures said nut to slide rail 62 and thereby provides micrometric movement of arm C upon adjustment of micrometer screw 80. A dial drum 82 formed on micrometer screw 80 indicates the micrometric movement of arm C. A reference block 66 is slidingly mounted on gauge rail 64 and may be secured in a desired reference position by a set screw 67.

Referring to Fig. 3, the outer end of arm C is supported by an outport column assembly B. Column assembly B comprises a vertical column 84 resting in an apertured block 96 which is secured to the index 10 by a bracket formed of a horizontal plate 92 and a vertical web plate 94. Column 84 is secured in a plumb position in block 96 by means of a clamp plate 98 and clamp bolt 100. Web plate 94 also serves to support a protractor 14 for indicating the angle of tilt of work table 12.

A steady block 86 slides vertically on column 84 and bears a forwardly projecting flange 102 for supporting a steady arm 116. Steady block 86 is secured to column 84 at the height proper to level arm C by means of a clamp plate 88 and clamp bolt 90. Steady arm 116 is pivotally mounted on flange 102 of steady block 86 by a pin 106 which is knurled for convenience in handling and which may be placed in any convenient hole 104 (Fig. 2) of the several provided in said flange.

Steady arm 116 is slotted substantially along its entire length to provide support for arm C without interfering with the movement thereof. At the outer end of steady arm 116, a shouldered swivel 118 pivotally supports a slide block 110 travelling along the outer end portion of arm C. Slide block 110 may suitably comprise a member channelled to receive arm C and to which a top plate 114 is secured by screws. Set screws 112 and 113, passed through slide block 110 at right angles to each other, bear on the gauge rail 108 of arm C and secure said block to said rail.

Again referring to Fig. 2, arm C includes a gauge rail 108 secured perpendicularly to slide block 70 travelling on arm A, as previously described. A tracer block 120 slides along gauge rail 108 and bears a bushing plate 130 in which standard drill guide bushings are placed. A micrometer screw 126 is journalled in a projecting flange 128 formed on traceor block 120. A micrometer nut 122, threaded on micrometer screw 126, is clampable to gauge rail 108 by means of a set screw 162. A handle 124 is formed on micrometer screw 126 for adjusting said screw and may include a dial drum assembly similar to dial 82 of micrometer assembly D. A clamp plate 166 and a clamp bolt 164 are provided to secure tracer block 120 in any desired position along gauge rail 108.

As shown in Fig. 5, bushing plate 130, which may be of any convenient length, is provided with holes 168 and 170 of convenient size for receiving drill bushings. The plate 130 may be secured to tracer block 120 by machine screws passed through holes 174. A channel 172 in bushing plate 130 provides a dado joint between block 120 and plate 130.

In Fig. 4, there is illustrated a gauge tool for locating by radial lengths holes in work centered on work table 12. The gauge tool includes a radial gauge rail arm or element 136, upon which a movable reference block 138 is mounted, and which may be secured thereto by a thumb screw 140. A slide block 152 travels along gauge rail arm or element 136, and includes spaced holes 154 for receiving a locating pin in a manner to be described hereinafter. A bracket 150 including a slotted end portion 148 is secured to one end of gauge rail arm or element 136. The gauge tool is clamped in position on work table 12 by means of the holddown screw 144, illustrated in Fig. 6. Holddown screw 144 is provided with a T-shaped base 146, adapted to be readily passed through the slots usually provided on work table surfaces. A knurled nut 142 is placed on screw 144 for convenience in securing the gauge tool in position.

The use and operation of the device is as follows: In drilling holes whose centers are defined by rectangular coordinates, tracer block 120 is moved in position by the adjustment of arm C along arm A and the movement of said tracer block along arm C until one of the bushing holes 168 or 170 in bushing plate 130 is accurately centered over the first hole to be drilled. The first hole is drilled and tracer block 120 is moved in position for drilling the second hole by appropriate movement of arm C and said tracer block. Tracer block 120 is accurately positioned for drilling the second hole by stacking gauge blocks along gauge rail 64 between reference block 66 and slide block 70, until the required abscissa displacement between the first and second hole is obtained and by stacking gauge blocks between reference block 132 and tracer block 120 until the required ordinate dimension between the first and second hole is obtained. If desired, any suitable gauge may be employed in place of gauge blocks or if gauge blocks are not available in the exact dimension required, blocks having the nearest dimension of that required may be employed and accurate minute adjustments made by means of micrometer screws 80 and 126.

In drilling holes located by polar coordinates, or in the solution of trigonometry problems, use is made of the gauge tool illustrated in Fig. 4. The offset clamping bracket 150 of the gauge tool allows said tool to be secured to the work table 12 of index 10 so that the centers of holes 154 in tracer block 152 travel along radii of said work table. The gauge tool may be provided with a pin projecting from the underside of gauge rail arm or element 136 to aid the location of said tool precisely over the center of work table 12. The separation between the holes 154 is known and of some convenient dimension, say 1 inch. In Fig. 7, the location of a hole center by means of the gauge tool is schematically illustrated. The position of the most convenient of the holes 154 is set precisely according to the required radial distance of the hole center from the work table center. The gauge tool is then clamped by holddown screw 144 to the work table 12 along a radius thereof corresponding to the angle reference line of the work. The work reference line is usually horizontal and therefore the gauge tool would be initially parallel with arm A. The required angle is then generated by the index 10 thereby rotating gauge rail arm or element 136 to the position shown in Fig. 7. The position of tracer block 120 is then adjusted, by the combined movement of said tracer block along arm C and slide block 70 along arm A, until a locating pin, carried in one of the holes 168 or 170 in bushing plate 130, is precisely vertically aligned with the selected one of the holes 154 in tracer block 152. The gauge tool is removed from the work table 12 and the work placed thereon in proper alignment. An appropriate drill guide bushing is placed in bushing plate 130 and the hole is drilled.

Thus it will be seen that holes having their locations stated in the form of polar coordinates may be radially and conveniently located by means of the invention. Reference to mathematical tables or computation is not required in the location. Also, use of the invention in solving common problems in trigonometry will occur to many. For example, the gauge tool may be set at a desired length and a desired angle generated by the index 10. The length of the side opposite the generated angle in a right triangle, whose hypotenuse is the length of set on the gauge tool, is then revealed by the displacement of tracer block 120 along arm C, and the length of the side adjacent the angle is shown by the displacement of arm C along arm A, both displacements being measured from the coordinates of the table center on arms A and C.

Obviously many modifications of the device specifically described and illustrated are possible in the light of the above teachings and many beneficial applications other than those specifically described will occur to persons skilled in the art. It should therefore be understood that the practice of the invention is not limited solely by the scope of the appended claims.

What is claimed is:

1. In combination with a precision angle generating machine including a rotatably mounted vertical spindle and a horizontal table mounted thereon, a universal drill jig, comprising a bracket fixed to said machine and having a horizontal rail secured thereto above the table level, a right angle arm slidingly mounted on said rail, a radial gauge element fixed to said table for gauging radii from the center of said spindle, a tracer block travelling along said right angle arm, and means interconnecting said gauge arm and said tracer block for positioning said tracer block at a desired location above said table, whereby, by means of the arrangement, holes can be located in a workpiece directly according to dimensions given in polar coordinate form without requiring computation or reference to trigonometric tables.

2. Apparatus as claimed in claim 1, with additionally a second bracket fixed to said machine and means secured to said second bracket for supporting the end of said right angle arm opposite said horizontal rail.

3. Apparatus as claimed in claim 2, with additionally clamping means for securing rigidly said right angle arm and said tracer block in the desired location above said table.

4. In combination with a precision angle generating machine including a rotatably mounted vertical spindle and a horizontal table mounted thereon, a universal drill jig, comprising first, second and third vertical columns, a horizontal gauge rail supported by said first and second columns above said table, a right angle arm slidingly carried at one of its ends by said gauge rail, means bearing on said third column for supporting the other end of said right angle arm, a tracer block slidingly carried by said right angle arm, a bushing plate for carrying drill bushings, said bushing plate being secured to said tracer block, and a radial gauge element mechanically associated with said table for gauging radii from the center of said spindle and mechanically associated with said bushing plate, whereby, by such arrangement, holes can be located in a work piece in said table directly according to dimensions given in polar coordinate form without requiring computation or reference to trigonometric tables.

5. A drill jig as claimed in claim 4, with additionally, means providing micrometer adjustment of the position of said right angle arm along said gauge rail.

6. A drill jig as claimed in claim 5, wherein said micrometer means comprises, in combination, a slide rail supported by said first and second columns parallel with said horizontal gauge rail, a micrometer screw journalled in said right angle arm at the end thereof supported by said gauge rail, a micrometer nut threaded on said micrometer screw and slidingly travelling along said slide rail, and means for clamping said micrometer nut to said slide rail.

7. A universal drill jig for guiding drills in producing holes in work, comprising, a pair of vertical columns, a horizontal gauge rail supported by said columns above the surface of the work, a right angle arm slidingly carried at one of its ends by said gauge rail, a tracer block including a drill guide bushing movably mounted on said right angle arm, a third vertical column, a steady block having a projecting flange and mounted on said third column, a steady arm resting on said flange, and swivel means secured to said steady arm and supporting the other end of said right angle arm, whereby said right angle arm is supported at both of its ends throughout its travel along said gauge rail.

8. A drill jig as claimed in claim 7, with additionally, a slide rail supported by said pair of vertical columns parallel to said gauge rail, a micrometer screw journalled in said right angle arm at the end thereof supported by said gauge rail, and a nut threaded on said micrometer screw and adapted to be secured to said slide rail to provide micrometric movement of said right angle arm along said gauge rail.

9. A drill jig as claimed in claim 8, with additionally, micrometer means carried by said tracer block to provide micrometric adjustment of the position of said tracer block along said right angle arm.

10. A drill jig as claimed in claim 9, wherein said micrometer means for adjusting the position of said tracer block comprises, in combination, a second micrometer screw journalled in said tracer block, a second nut threaded on said second micrometer screw, and means for securing said second nut to said right angle arm.

References Cited in the file of this patent

UNITED STATES PATENTS

| 1,258,137 | Neth | Mar. 5, 1918 |
| 1,293,009 | Blaustein | Feb. 4, 1919 |
| 1,335,347 | Moulds | Mar. 30, 1920 |
| 2,752,802 | Bull et al. | July 3, 1956 |

FOREIGN PATENTS

| 552,501 | Great Britain | Apr. 12, 1943 |